(12) United States Patent
Black

(10) Patent No.: US 8,234,296 B1
(45) Date of Patent: Jul. 31, 2012

(54) METHOD FOR DISTRIBUTED RDSMS

(75) Inventor: Damian Black, San Francisco, CA (US)

(73) Assignee: SQLstream Inc., San Francisco, CA (US)

( * ) Notice: Subject to any disclaimer, the term of this patent is extended or adjusted under 35 U.S.C. 154(b) by 0 days.

(21) Appl. No.: 13/290,967

(22) Filed: Nov. 7, 2011

Related U.S. Application Data

(60) Division of application No. 12/333,230, filed on Dec. 11, 2008, now Pat. No. 8,078,609, which is a division of application No. 11/313,053, filed on Dec. 20, 2005, now Pat. No. 7,480,660, which is a continuation of application No. 10/390,091, filed on Mar. 15, 2003, now Pat. No. 7,010,538.

(51) Int. Cl.
G06F 7/00 (2006.01)
G06F 17/30 (2006.01)

(52) U.S. Cl. . 707/769; 707/805; 707/954; 707/E17.014; 707/E17.129; 707/E17.009

(58) Field of Classification Search .................. 707/769, 707/805, 954, E17.009, E17.014, E17.129, 707/E17.045, 713, 770
See application file for complete search history.

(56) References Cited

U.S. PATENT DOCUMENTS

| | | | | |
|---|---|---|---|---|
| 5,226,111 A * | 7/1993 | Black et al. | ............ | 707/999.104 |
| 5,619,692 A | 4/1997 | Malkemus et al. | | |
| 5,815,689 A | 9/1998 | Shaw et al. | | |
| 5,845,283 A | 12/1998 | Williams et al. | | |
| 5,920,828 A * | 7/1999 | Norris et al. | ..................... | 702/14 |
| 6,334,123 B1 | 12/2001 | Ross et al. | | |
| 6,339,772 B1 * | 1/2002 | Klein et al. | ..................... | 707/704 |
| 6,408,292 B1 | 6/2002 | Bakalash et al. | | |
| 6,453,313 B1 | 9/2002 | Klein et al. | | |
| 6,496,831 B1 | 12/2002 | Baulier et al. | | |
| 6,502,133 B1 * | 12/2002 | Baulier et al. | ................ | 709/224 |
| 6,625,593 B1 | 9/2003 | Leung et al. | | |
| 6,681,230 B1 | 1/2004 | Blott et al. | | |
| 7,010,538 B1 | 3/2006 | Black | | |
| 7,065,571 B2 * | 6/2006 | Schweitzer et al. | .......... | 709/223 |
| 7,480,660 B1 | 1/2009 | Black | | |
| 8,078,609 B2 | 12/2011 | Black | | |
| 2002/0087709 A1 | 7/2002 | Kerr et al. | | |
| 2002/0103818 A1 * | 8/2002 | Amberden | ..................... | 707/205 |
| 2002/0198867 A1 | 12/2002 | Lohman et al. | | |
| 2003/0041053 A1 | 2/2003 | Roth | | |

(Continued)

OTHER PUBLICATIONS

Odej Kao—"Parallel and Distributed Methods for Image Retrieval with Dynamic Feature Extraction on Cluster Architectures"—Database and Expert Systems Applications, 2001. Proceedings. 12th International Workshop on—Date of Conference: 2001, pp. 110-114.*

(Continued)

Primary Examiner — John E Breene
Assistant Examiner — Anh Ly
(74) Attorney, Agent, or Firm — Alan W. Cannon

(57) ABSTRACT

Methods for processing streaming data records are provided that include facilities for defining and naming multiple input and output data streams using relational processing definitions and abstractions similar to those found in relational database management systems (RDBMS) and embodied as a set of communicating stream processing nodes. The result is a Distributed Data Stream Management System (DDSMS) which is also a kind of Relational Data Stream Management System (RDSMS). The former comprises a set of Relational Data Stream Management System (RDSMS) nodes, whereas the latter might contain only a single RDSMS node.

18 Claims, 2 Drawing Sheets

U.S. PATENT DOCUMENTS

| | | |
|---|---|---|
| 2003/0101253 A1 | 5/2003 | Saito et al. |
| 2003/0212664 A1 | 11/2003 | Breining et al. |
| 2003/0236904 A1 | 12/2003 | Walpole et al. |
| 2004/0215670 A1 | 10/2004 | Holenstein et al. |
| 2005/0004896 A1 | 1/2005 | Cseri et al. |
| 2005/0021745 A1 | 1/2005 | Bookman et al. |
| 2005/0091240 A1 | 4/2005 | Berkowitz et al. |
| 2005/0203673 A1 | 9/2005 | El-Hajj et al. |
| 2008/0120283 A1 | 5/2008 | Liu et al. |
| 2009/0094195 A1 | 4/2009 | Black |

OTHER PUBLICATIONS

David Loshin—"Rule-Based Data Quality"—CIKM '02, Proceedings of the eleventh international conference on Information and knowledge management, Nov. 4-9, 2002, McLean, Virginia, USA, Copyright 2002 ACM—(pp. 614-616).*

Babu, Subramanian and Widom., A Data Stream Management System for Network Traffic Management Workshop on Network-Related Data Management (NRDM 2001), ACM SIGMOD/PODS 2001, May 25, 2001, Santa Barbara, CA, USA.

Babu and Widom., Continuous Queries over Data Streams, ACM SIGMOD Record, ACM SIGMOD Record vol. 30 Issue 3, pp. 109-120, Sep. 2001.

Babcock, Datar and Motwani., Sampling from a Moving Window Over Steaming Data, Proceedings of the 13th Annual ACM-SIAM Symposium on Discrete Algorithms, pp. 633-634, Jan. 6, 2002, San Francisco CA, USA.

Babcock et al., Models and issues in Data Stream Systems, pp. 1-16, 2008.

Carney, Cetinemel, Cherniack et al., Monitoring Streams—A New Class of Data Management Applications, Proceedings of the 28th VLDB Conference, Aug. 20, 2002, Hong Kong, China.

Chandrasekaran and Franklin., Streaming Queries over Streaming Data, Proceedings of the 28th VLDB Conference, Aug. 20, 2002, Hong Kong, China.

Cherniack, Balakrishnan, Balazinkska et al., Scalable Distributed Stream Processing, Proceedings of the 2003 CIDR Conference, Jan. 5, 2003, CA, USA.

Datar, Gionis, Indyk and Motwani., Maintaining Stream Statistics over Sliding Windows, Proceedings of the 13th Annual ACM-SIAM Symposium on Discrete Algorithms, ACM SIGMOD Record vol. 30 Issue 3, pp. 635-644, Jan. 6, 2002, San Francisco, CA, USA.

Dobra, Garofalakis, Gehrke, Rastogi., Processing Complex Aggregate Queries over Data Streams, Proceedings of the 2002 ACM SIGMOD International Conference on Management of Data, pp. 61-72, Jun. 4, 2002, Madison, Wisconsin, USA.

Fegaras et al., Query Processing of Streamed SML Data, 2002, pp. 126-133.

Finklestein., Common Expression Analysis in Database Applications, pp. 235-245, 1982.

Goldberg et al., Stream Processing, 2008, pp. 53-62.

Jin., Relational Subscription Meddleware for Internet-Scale Publish-Subscribe. pp. 1-8, 2003.

Humphreys et al., Chrornium: A Stream-Processing Framework for Interactive Rendering on Clusters, 2002, pp. 693-702.

Kang, Naughton and Viglas., Evaluating Window Joins over Unbounded Streams, Proceedings of the 28th VLDB Conference, Aug. 20, 2002, Hong Kong, China.

Madden and Franklin., Fjording the Stream: An Architecture for Queries over Streaming Sensor Data, Proceedings ICDE 2002. pp. 555-566, Feb. 26, 2002, an Jose, CA, USA.

Madden, Shah, Hellerstein and Raman, Continously Adaptive Continuous Queries over Streams, Proceedings of the 2002 ACM SIGMOD International Conference on Management of Data, pp. 49-60, Jun. 4, 2002, Madison, Wisconsin, USA.

Motwani, Widom, Arasu et al., Query Resource Management, and Approximation in a Data Stream Management System, Proceedings of the 2003 CIDR Conference, Jan. 5, 2003, Asilomar, CA, USA.

Naughton, Chen, Kang et al., The Niagra., Internet Query System IEEE Data Engineering Bulletin, IDEAS 2000, vol. 24, No. 2, pp. 27-33, Mar. 6, 2000, USA.

Nippl, Rantzau and Mitschang., Stream Join: A Generic Database Approach to Support the Class of Stream-Oriented Applications, Proceedings of International Database Engineering and Applications Symposium (IDEAS 2000), pp. 83-91, Sep. 12, 2000, Yokohama Japan.

Viglas and Naughton., Rate-Based Query Optimization for Streaming Information Sources, Proceedings of the 2002 ACM SIGMOD International Conference on Management of Data, pp. 37-48, Jun. 4, 2002, Madison, Wisconsin, USA.

* cited by examiner

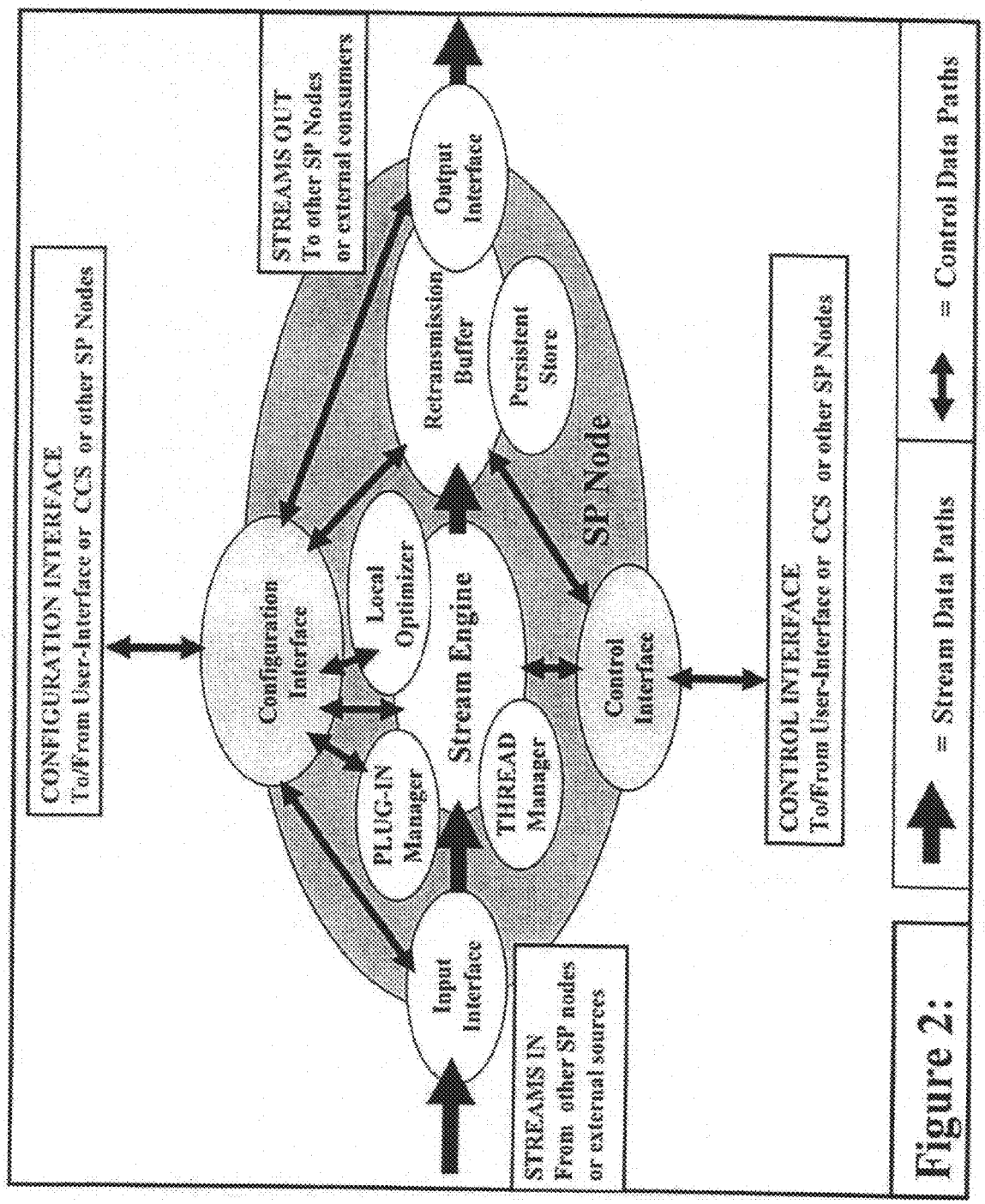

METHOD FOR DISTRIBUTED RDSMS

CROSS-REFERENCE TO RELATED APPLICATIONS

This application is a division of U.S. patent application Ser. No. 12/333,230, filed on Dec. 11, 2008, now U.S. Pat. No. 8,078,609, which is a division of U.S. patent application Ser. No. 11/313,053 filed on Dec. 20, 2005, now U.S. Pat. No. 7,480,660, which is a continuation of U.S. patent application Ser. No. 10/390,091, filed on Mar. 15, 2003, now U.S. Pat. No. 7,010,538, all of which are incorporated herein by reference in their entireties.

BACKGROUND OF THE INVENTION

1. Field of the Invention

This invention relates to the field of data management and data processing and describes a method of integrating application or service components and sources and consumers of data records, normally over data or computer networks. The sources of data might be software applications, hardware devices, sensors, or data streaming into files or databases, or transaction records or transaction logs. The data might relate to a wide range of industries such as stock market data in financial services, service health, status or usage records in telecommunications, or plant operating status in industrial automation to name just a few. In particular, the invention relates to ways and means of managing, viewing and processing streams of data records flowing between the elements making up information processing systems, and applications thereof. The concept of a relational data stream management system (RDSMS) is described and the invention is a specific method for performing data processing using a specific distributed RDSMS approach.

2. Description of the Related Art

With the advent of the Internet, there are many new ways for designers of computer information systems to connect, integrate and manage the components of the information systems and computer applications.

There are a number of university research projects (see web link http://www-db.stanford.edu/sdt/) which are, in the main, focusing on extending databases to allow for stream processing, treating RDBMS (relational database management systems) relations as infinite tables.

The work so far published is focused on either extending relational databases (or other databases) to add streams capabilities (such as the STREAM project at Stanford University http://www-db.stanford.edu/stream/ which is not distributed and does not support the manageability or plug-in capabilities described below), or to devise ways of improving query performance and scheduling and the theoretical resource management challenges (predicting how much processing can be performed within given memory and other computing resources). There are also some papers looking (from a mainly theoretical perspective) at a few monitoring-style applications.

This invention differs from the existing published work in a number of important ways. First, the focus here is on an invention, method or means for managing a distributed collection of relational stream processing nodes that work together as a single system to create a complete Distributed Data Stream Management System ("DDSMS"). This DDSMS operates as a single, manageable, extensible infrastructure, processing and managing multiple streams of records along with multiple views of those record streams including their routing across the network of stream processor nodes. It differs from other systems described by providing a novel combination of facilities, including an SQL interface (SQL is supported by most relational database systems today), and operating as a single system managed and configured from a central configuration server where the single system itself comprises a dynamically extensible set of interoperating stream processing nodes each of which supports a plug-in capability for dynamically extending the capabilities of the stream processing engines. Each node has not only input and output interfaces to support streams, but also has a control and a configuration interface to support dynamic external control and management of nodes, and to allow nodes to control the behavior of one another and interoperate with one another, with the goal of behaving and appearing like a seamlessly integrated single complete system. The system manages multiple sources and destinations for the streams, and covers specific business and technical applications thereof. Rather than concentrating on the design, method or means for a specific relational stream processing node, this invention focuses on how to design a whole DDSMS comprising a set of such or similar nodes with specific capabilities that are configured and work together as seamless complete system. In comparison with systems such as Aurora (see web references link earlier), this approach differs in its treatment of the distributed nodes as a seamless single system with a central configuration and management service, its support for a plug-in extensibility to allow specialization of the system for specific application domains, and its inclusion of control and configuration interfaces for each processing node.

Finally, the invention includes a short list of applications of this DDSMS which offer novel solutions to existing problems, and offer compelling business value and clear advantages over existing approaches and solutions.

SUMMARY OF THE INVENTION

A method and apparatus for a DDSMS (see earlier) is described. A DDSM comprises a set of communicating data stream processing nodes. We also describe a means for constructing stream processing nodes which are relational in their processing and querying behavior (they conform to standard relational processing logic and semantics as originally invented by Codd—see reference below), but which differs from some other approaches in that it does not include a persistent relational database element. In other words, it is not an extension of a relational database, but is rather purely designed for relational stream processing. In this approach, any data that need to be stored in a relational database or processed from a relational database are streamed out of the DDSMS to an external database (or databases) or similarly streamed into the DDSMS from external databases. In this way, a DDSMS architecture which interoperates with databases but which does not itself contain any database facilities for storing and managing tuples can be created using sets of such nodes. The invention of the overall DDSMS here allows for either kinds of relational stream processing nodes—either the one included as part of this invention, or others that are constructed as extensions to relational databases to support the necessary relational streaming operations described below.

The method then describes various ways that the DDSMS can be used to solve business or technical problems relevant to the real world. These are distinct and differ from those described in external publications.

BRIEF DESCRIPTION OF THE DRAWINGS

FIG. 2—A diagram showing the abstract architecture of an individual SP node made up of its component parts (subsystems). The four external interlaces to node are shown and labeled, along with internal and external data flows. The fat arrows indicate flows of data records, whereas the skinny arrows indicate exchanges of control data. If an object overlaps and is on top of another object, the latter represents a subsystem of the former. Data paths between systems and their subsystems are not shown and are implicitly assumed.

DETAILED DESCRIPTION

A. System Overview

1. Terminology

Figure 1:
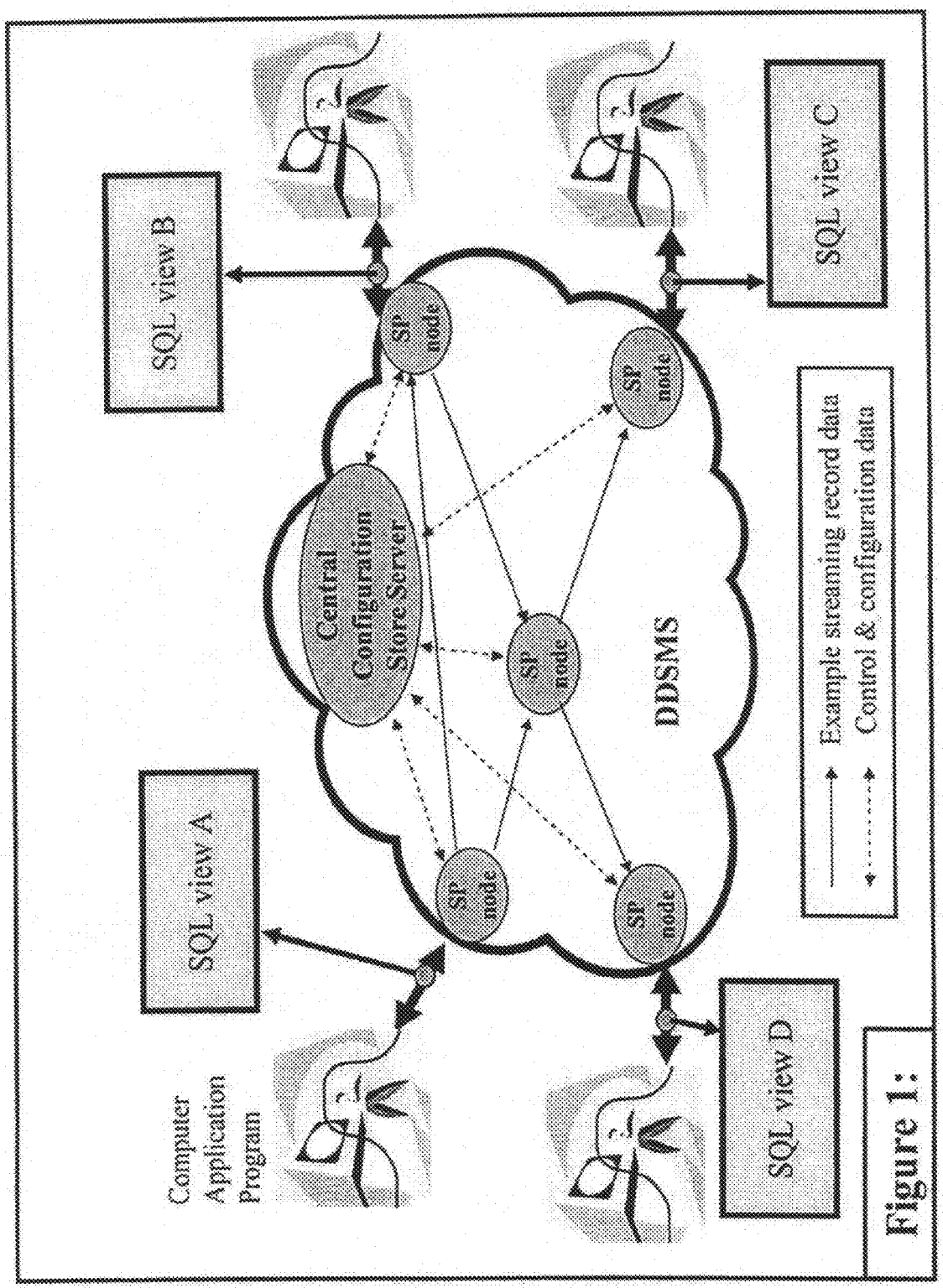
FIG. 1—A diagram showing an example of a deployment of a DDSMS, with Stream Processing (SP) nodes, Central Configuration Store server (CCS) communicating with one another and with external computer applications by means of a computer data network. The cloud drawn represents the single, seamlessly integrated, complete management domain for the DDSMS.

The Relational data model is based on the mathematics of relations and is derived from the seminal work of E. F. Codd ["A Relational Model of Data for Large Shared Data Banks", CACM 13, No. 6, June 1970]. So far, commercial embodiments of the relational data model have been realized as Relational Data Base Management Systems (RDBMS) such as Oracle and others. Academic work, led by the database research community world-wide, has recently focused on applications of the relational data model to streaming data records or tuples. These streams are modeled as (potentially) infinite data tables, often with timestamps on each row of data. A row corresponds to a record that arrives in real-time.

In the below, the term "tuple" and "record" can be used interchangeably. A tuple is a relational term for an ordered collection of fields. An n-tuple has n fields. For example, a triple is the same as a 3-tuple, and has three fields. In the methods described in the claims of the invention the terminology used is "records". This is because records are what most real world information systems process. Such records are represented as tuples when processed using the method of the invention. This will become clearer as the method and means are described.

A Relational Data Stream Management System (RDBMS) is the similar to a Relational Data Base Management System (RDBMS), but processes streams of data records rather than tables of data records. Relational operations are similarly applicable to streams just as they are when defined over tables (relation operations such selection, projection, joins, unions etc). This means that relational queries and processing operations, which are mathematically well defined, can be logically extended to have similar simple yet powerful mathematical meaning when applied to streams. Such relational stream operations have a declarative semantics, which offers key benefits in the world of data management. The declarative nature of their semantics allows one to define relational expressions that can be used to derive a new stream of records from an existing stream by describing what the properties are of the records of the derived stream, rather than by detailing exactly how to construct the new stream from the old in terms of the specific processing operations to be performed. In other words, the logical mathematical relationship between the new stream and the original stream is described, instead of the sequence of record processing operations one might perform in order to create the new stream from the old. Such mathematical (logical) semantics allows the rewriting of a relational expression with another equivalent perhaps simplified relational expression, while guaranteeing that the expressions are semantically identical. This is immensely useful in allowing for automatic query optimization, where a software optimizer can rewrite retrieval expressions into others that are identical but more efficient when interpreted by stream processing software.

A single node RDSMS can be constructed as a superset of a conventional RDBMS that processes potentially multiple input data streams and generates potentially multiple output data streams along with the usual relational database tables. This describes the nature of the work performed at Stanford University [Jennifer Widen et al., http://dbpubs.stanford.edu/pub/2002-41]. However, we describe here an invention of a RDSMS that it is not an extension of a RDBMS, processes only streaming data (it does not manage persistent tables) and additionally interacts with other RDSMS nodes, which together constitute a single integrated relational stream processing system. The stream processing is performed in what we call a relational Stream Processing (SP) node. A single SP node and its Configuration Store (see later) together comprise a RDSMS. If there are multiple SP nodes interoperating then we have a different invention, which we call a Distributed Data Stream Management System, which is the main focus of this invention.

The main invention we describe is such a Distributed Data Stream Management System (DDSMS). A DDSMS comprises a set of relational SP nodes, and is managed as a single system to provide an infrastructure solution for processing streaming data over a large scale computer network with multiple and potentially distinct sources of and destinations for streaming data. The streams are routed across the relevant RDSMS nodes in order to perform the processing required, with potentially multiple concurrent streams of data crisscrossing the network of SP nodes. The DDSMS is relational in terms of its data processing, and its data can be viewed as flows of relational tuples. Tuples may contain fields which normally contain the same kinds of data types commonly found in a database (such as integers, floats, dates etc) and which might also be variable length or variable format types such as character strings, bit strings or other binary content (such as audio, video, or pictures, or other digitized data).

2. Comparison of DDSMS Model with RDBMS and RDSMS Models

Whereas an RDBMS (relational database management system) and the newly emerging RDSMS each are usually single node systems (there is a server that processes a stream of queries or transactions and generates a stream of results), a DDSMS comprises a set of distributed SP nodes. These nodes interoperate in order to behave as a complete seamless system that achieves the data stream processing specified in its relational operations. Whereas creating Distributed DBMS entails overcoming the major technical challenges of synchronizing multiple databases over potentially large geographically separated nodes (and so never really have been successful in the marketplace), DDSMS are relatively straightforward to construct and work elegantly and efficiently. They work well because there is no shared global state to synchronize, and all the relational operations are side-effect free (i.e. truly declarative in nature). Relational operators operate on streams as inputs, leave those streams unaltered (to flow to other potential consumers), and then generate instead new streams as outputs which can in turn flow to other SP nodes. The specific techniques and architecture of the invention are described below.

3. Relational Data Streams

First let us visualize a relation as a table of rows comprising the tuples of that relation, just as is found in a RDBMS like Oracle. The relational operators of Projection (selecting a columns from a table to create another table holding only those columns), Selection (retrieving rows that match certain criteria), Joining (where two tables are merged by matching on a common attribute that is defined as a given column), Union (merging two tables by set-theoretic multiplication of the tuple combinations) and other relational operations can all be readily re-interpreted to apply to record streams resulting in the creation of a new record stream. The records in the streams correspond to the tuples in a relation. Projection and Selection have a natural and obvious meaning when applied to streams. Projection filters out only the fields specified in the Projection specification and Selection filters out only the tuples that satisfy the Selection specification. Joins and Union also have an obvious interpretation, but we first need to add a time field. The notion of a time window is then introduced which is applied to any relational operations. For example, a Join operation might be defined over a time window of five minutes. The meaning is that the streams are joined only for matches of tuples made over the given time window. Such time windows can be specified to be Rolling or Paged. The former means that when an operation is applied over a rolling time window of say n minutes, only records whose time field lies within the last n minutes of the reference time of processing are considered. Hence a single tuple might participate in multiple successive operations, until it is too old to qualify for processing in what becomes the new current processing time window. For example, operations might be totals of tuples over the last 5 minutes. You can visualize a time window sliding or rolling over a series of tuples. In comparison, the paged time window pages over the tuples so that every tuple occurs in only a single time window. When totals of tuples are calculated over 5 minute paged windows, then you will get an aggregation of tuples with only a single aggregated output tuple for each 5 minute interval. In Paged time windows all time is chopped up into non overlapping time intervals and a record will always belong to only a single window—different from rolling windows where records belong to many different successive rolling windows. When two streams are Joined, records are matched using the join field (a field that must exist in all records to be joined) for records that lie within the same (specified) time window (based on the designated timestamps of those records) and the result of each such match is the creation of a new output stream record comprising a union of the original fields of the constituent records. The nature of the match varies according to the type of Join. For example, in an Equi-join the matching comparison is simply equality (and normally the matching field is included only once in the output record since the values are identical). Other joins are also possible, such as ">". "<", sub-string and many others. Such Join operations have practical application such as in matching buy-sell transactions for a given financial instrument within a given time window given streams of buy requests and sell requests. Another application is pulling together all of the pieces of a commercial transaction (integrating data from multiple sources such as multiple service elements) and matching on a shared transaction id (or perhaps IP address) within a given time interval in order to create a complete, integrated transaction record. Records falling outside the time window are deemed to be either erroneous (to be processed externally later) or else are from separate distinct transactions. Such behavior is important in real-time decision making applications in many industries including financial services and telecommunications. An extended subset of SQL is the preferred language for representing the definition of streams, but graphical and other alternative ways of representing the definitions is permitted also in addition to SQL. The subset of SQL is given by the purely relational operations (all procedural and database state manipulations are omitted). The extensions are based on the incorporation of time windows. For example, a given SQL query might specify a stream which comprises two input streams joined by IP Address over a paged 5 minute time window. This would look identical to an SQL fragment for joining two input tables on the IP Address column, except that the time window value (5 minutes) and nature (paged rather than scrolled) must be either implicitly (through some default value or configuration parameter) or explicitly (a Window statement or some kind is added to extend the SQL language—hence an extended subset of SQL, a subset because there is no meaningful interpretations for the procedural and other database specific non-relational operations that are also part of the SQL language).

4. System Management, Set-Up and Configuration

Streams in the DDSMS can have names, can have security access permissions (to allow particular users or applications or groups thereof to read the records of the stream) and are defined by a relational expression—a set of relational operators that operate on streams (as defined in the previous section)—which in turn might operate on other named streams. Such relational stream expressions can be nested (as in SQL for relational queries for RDBMS). The relation expression can also include the names of programs (or plug-ins) that can also generate streaming data (there has to be some way of generating the original sources of streaming data). The system normally comes with a set of useful such programs and plug-ins to stream data from and to relational databases, files, directories of files, and to encapsulate the outputs or inputs for other programs and applications (using operating system streaming primitives and redirecting inputs and outputs of such programs). The system is normally extensible, so that new plug-in programs can be written to extend the system dynamically. Plug-ins also can perform computational processing of tuples, consuming and generating tuple streams, thereby providing extensions to the usual relational operation vocabulary.

Streams also have a location that corresponds to the host system that creates the stream. Where a stream is replicated for load balancing purposes, there might be multiple locations—but for each instance of the replicated stream (the location of which is resolved at connect time—i.e. when a user or application tries to read the stream) at any given time interval there will be stored somewhere in the DDSMS the identity of the host machine responsible for generating the tuples of the stream. Some implementations of the DDSMS might expose the identity of the host machine of a stream. Other more sophisticated implementations may hide the source machine, and alter it dynamically, in order to perform optimization of the stream processing by relocating the stream to another more favorable machine (favorable in terms of processing power, physical location, network bandwidth, utilization, disk or main memory capacity etc). Another example might entail breaking down a single stream generating operation into separate sub-streams that flow into one another, and then redistribute the work to different machines for each sub-stream. This might happen as the result of a sophisticated automatic or dynamic optimization operation.

The DDSMS may support a method to perform Global Optimization to improve the system performance by analyzing the relational stream definitions and interdependencies, and by automatically rewriting the relational expressions (the stream definitions) with alternative, logically equivalent but more efficient definitions (in terms of execution). Such optimized relational definitions may include embedded directives that are used in the execution of the stream expressions and also that are used in distributing the stream definitions to the relevant SP nodes. The rewriting approach is modeled after similar relational rewriting procedures of relational databases, but reinterpreted in the streaming context, and with differing "cost functions" that evaluate the goodness of the optimization progress and of the rewritten expression. The optimization goal is to improve the performance of the DDSMS by breaking up the relational stream operations or definitions (which make up the definition of the stream or view) into component pieces that are allocated to different SP nodes. In this way, for example, streams might be aggregated close to their source, rather than transmitting every record across an expensive network only to then perform aggregation. The order and placement of the SP operations onto specific SP nodes can make a tremendous difference to the overall system performance. The optimization is performed in conjunction with a specified Optimization Policy and considers metrics available about the physical processing characteristics of the individual stream processors (SP nodes), and the computer infrastructure that is used to host and execute them (optionally including, without limitation, the speed and nature of individual computer systems such as system execution cost, clock speed, memory, number of processors, operating system, execution workload, also considering the bandwidth, speed or network connection costs, or network reliability, and the size, speed and cost of storage whether that be main memory or secondary storage). It also takes into consideration Optimization Constraints and parameters such as the maximum amount of time to spend on optimization. The policies include, without limitation, differing optimization goals either for the complete system or for specific streams such as maximizing total throughput, minimizing latency, minimizing cost, minimizing transmission or retransmission of data, minimizing or maximizing loads on specific computer systems or network links, or maximizing reliability. Such optimization optionally can be performed dynamically, whereupon the DDSMS would transparently (to the outside world) relocate and restructure streams from one SP node to others as the execution of the transformed relational stream expressions requires. The current status and location of the components of the stream are always held in the Central Configuration Store. The optimizer might perform factoring, where anonymous sub-streams are created and reused in the definition of other streams. Such sub-streams allow for efficient reuse of DDSMS system wide resources and can reduce transmission, retransmission and avoid redundant stream processing too.

Streams implicitly have a defined structure in that the names, types and order of the fields in the tuples of the stream will be defined by the relational expression that makes up the stream. Each tuple comprises a set of self-describing data items called fields, which are essentially triples. Each triple has a name, type and value such as <Family,String,"Black">. The allowed type definitions should match the conventions of RDBMS and SQL (types are called domains in SQL) to allow familiarity and easy integration. The names of all fields (or attributes—another term for the same thing) are held in a central configuration store, along with type definitions and stream definitions.

The Central Configuration Store server (CCS) is a server that communicates with all nodes in the DDSMS. Each node comprises an individual SP node, which performs the stream processing consistent with its stream definition as held in the CCS. Each node caches its configuration data in case the central configuration store is unavailable. Any changes in the configuration store can be broadcast to all nodes, or else there are tools that allow a more controlled and selective dissemination of the changes made (to ensure that the resulting streams make commercial and consistent sense, as there might be dependencies within and outside of the system that need to be taken into consideration before such changes are more widely made).

FIG. 1 (see drawings) illustrates a system including one embodiment of the invention. Applications running on external computer systems generate and consume streams outside of the DDSMS, and each stream is defined as a relational view (e.g. SQL views A through D)—that is, the interpretation (or execution) of the relational expression that defines the stream by the DDSMS and the Stream Processing (SP) nodes that it comprises. The cloud drawing represents a computer data network linking the SP nodes, CCS and external computer systems. The arrows represent data flows. The benefit for external applications and data consumers is the ability for each to define its own view on the streams, creating new stream definitions to meet its own specific needs on top of existing definitions. This offers a data abstraction, insulating the applications and users from changes to stream structures that might happen outside (e.g. changing external sources of data or format of data).

B. Architecture and Embodiment of DDSMS

FIG. 1 (see drawings) illustrates the conceptual architecture of the DDSMS. A DDSMS essentially comprises a network of communicating stream processing (SP) nodes along with a Central Configuration Store Server. One embodiment of such a system would comprise a program acting as a logical server for each of these entities. The code of each SP node is essentially similar, but each one performs the stream processing as defined by the definitions of the streams that it is hosting, at any given time interval. Each stream might be transmitted as TCP-IP messages, used to communicate between the servers. Alternatively UDP-IP or other protocols may be used. Streams are made up of records which represent tuples, and each tuple comprises a set of fields which themselves are triples (to hold and describe the record's data). One embodiment of such a triple would be a variable length record itself comprising two fixed length fields (to store the field's name and type identifiers) and a variable length field (to hold the field's value). Each record in the stream might then consist of first a header that indicates the number of fields in the record, followed by the variable length fields themselves. A stream would then be made up of a sequence of such tuples (a tuple is a collection of fields) sent in batches, the batching determined by the arrival rate of the records. The batch size is determined to be a convenient (cost effective) unit of transmission, but if records are arriving slowly, the system might output batches of even a single record (in order to avoid delays in transmission). The batching policy is determined by a Local Optimizer, which optimizes according to configured optimization directives (for example, to maximize throughput or to minimize latency of transmission). Such a batch would store the number of records in the batch followed by the records, and the entire batch would be sent as a single network transmission message. The stream itself is made up of such a sequence of network messages.

The architecture of one embodiment of a SP node is shown in FIG. 2 (see drawings). Protocols other than TCP-IP may be used as the basis of batch transportation. All input streams are directed to a SP node through its Input Interface. All output streams are directed to external systems or other SP nodes through the Output Interface of the SP node generating the stream. The Output Interface optionally supports efficient means for broadcasting or multicasting tuples over data networks (so as to avoid repeated unnecessary point-to-point transmission of data where the network supports a more efficient means) in such a way that the Input Interfaces of the target SP nodes will receive those tuples.

With the data structured into batches this way, streams can be consumed and generated by the stream processing nodes tuple by tuple, and each receiving node can break down the tuple into self-describing data items, right down to the field level. The destination machines (for example, given by the IP address along with the TCP-IP port) for a stream at any given time interval can be determined from the current state of the cached configuration information. Any changes in configuration are disseminated by the CCS according to a configurable specified policy, which includes broadcasting all changes immediately. The stream processing nodes normally have a thread or process that continually listens to a known TCP-IP port for any configuration or other control information (such as starting and stopping) that might be sent (normally sent by the configuration server). This constitutes the Management Interface of the SP node.

The Central Configuration Store server might be embodied as a RDBMS application, using a relational database to store the configuration information such as the stream definitions and machine location, access rights and the definition of all currently known field names and types. The central configuration server should normally be deployed in a high-availability configuration with a hot stand-by ready to take over upon any failures.

All of the servers (stream processing nodes or configuration servers) comprise logical servers and might be mapped onto one or many computer servers or systems. In other words, there is the concept of the separation of logical servers from physical servers, to allow for different and changing physical deployments. This will make no logical difference to the processing, but will definitely impact the hardware deployment architecture. Individual nodes and servers in some embodiments may be able to take advantage of multiple processor computers in order to increase through-put processing capacity.

As tuples enter the DDSMS, the system generates timestamps to label each tuple with the time of entry. The timestamps need to be of sufficient granularity to meet the needs of acceptable precision vis-à-vis the time window specification of the relational stream queries. Ideally, all timestamps should be based on international standard time code (such as UTC—Coordinated Universal Time) to avoid complications of comparing data from different time zones. Alternatives are permissible. Queries may specify that alternative fields should serve as timestamps (which might correspond instead to some time or key more pertinent to the specific application that is using the DDSMS). An example might be the record creation time at the record's original source, or perhaps the time of the original transaction etc). Timestamps of output records are derived from the timestamps of input records. They can be also explicitly defined (just as the other output fields are explicitly defined as a part of relational stream definition of the resulting output stream) or else a default policy can be set where the output timestamp is automatically created (often given as the earliest, latest or average of the input timestamps of the records contributing to the output record). In order to ensure time synchronization across all SP nodes standard techniques should be employed to synchronize machine clocks (such as using NTP and other well proven mechanisms). When the timestamp is given by an existing field, it should have numerical properties consistent with the windowing semantics applied to time, so that the window specification and queries are meaningful. For example, a record key which is a monotonically increasing quantity might make sense.

Some embodiments of the DDSMS will include reliable retransmission of data between nodes. Each node buffers up its output streaming tuples, in case there is a need to retransmit the data. The amount of buffering is a configurable item and depends upon the amount of space required to store the tuples. The buffers optionally can be stored on disk to allow for potentially large amounts of data. There is a handshaking protocol in such system embodiments (operated over the SP node's Control Interface) that allows consuming nodes to indicate that they have received certain stream data tuples and have no further retransmission needs from the source (that is, to signal back to the sender that from its own perspective, it will never need again to seek retransmission of the tuple; this implies that the records will have in turn been passed on to another consumer downstream that has indicated they have been received and processed; this might in turn continue recursively downstream through other SP nodes). The handshaking is performed by one SP node with another through their Control Interfaces. The Control Interface might be physically implemented as part of the Input Interfaces or Output Interfaces, interleaved with the in the input or output transmission of record streams (interleaved somehow). These are physical alternative embodiments of the same logical design. The Control Interface is, however, a separate logical entity of the SP node.

The stream generator, when it has received such acknowledgments from all consumers, will dispose of buffered tuples which are no longer needed. The SP node manages the output tuples in a Retransmission Buffer, holding all output tuples in that buffer until it is signaled that it is safe to now dispose of the tuples. Retransmission Buffers can be configured to be persistent, in which case the tuples are written to an output queue stored on disk or similar persistent media managed by the Persistent Store. The main memory space and disk space allocated for the Retransmission Buffers are configurable quantities and constrain the maximum number of tuples that can be stored before tuples have to be dropped. If a consumer fails, when it comes back to life, it transmits a "back alive" message to all stream suppliers, so that they can retransmit "unacknowledged" records—those that were not acknowledged as fully processed (in such a way as to be independent of a failure of the acknowledging node). One embodiment of such a recovery mechanism can also use Recursive Recovery, where a node can seek in turn retransmission of tuples from its suppliers, reprocesses those tuples and then streams the regenerated data out again in order to meet retransmission requests of external consuming nodes. This allows for more recovery scenarios and allows for reducing the buffering space of intermediate SP nodes (as they might be able, if necessary, to take advantage of other upstream sources of tuple supply—nodes further upstream). When tuples are transmitted, there should be a way of recognizing the identity of the tuple, in order to avoid processing duplicate retransmitted records. Such a scheme might utilize the timestamp of the record along with a unique serial number field, generated by the SP node. The SP node has to store sufficient information in order to be able to regenerate accurately any such record identification information, in such as way that consumers of retransmitted records can detect and remove duplicates.

Embodiments of the system with such recovery mechanisms as record retransmission and Recursive Recovery allow for systems with very reliable data delivery, but which will take time to "catch up" while retransmitting or reprocessing data. Such systems are suitable for billing applications or applications where data loss must be minimize or eliminated (commercial transactions for example). Not all applications will need this capability. This capability complements other techniques such as hot standby processing nodes using high availability techniques. An embodiment might allow optional configuration of such recovery mechanisms, according to system throughput, reliability and solution cost goals. Reliable transmission can be disabled in order to reduce buffering space and speed up throughput, in which retransmission of tuples might not be possible. Similarly, Recursive Recovery would normally be an additional option to the more basic recovery mode of simple retransmission of tuples from the Retransmission Buffers.

Tuples arrive through the Input Interface of the SP node and are buffered for efficiency to smooth out any fluctuations in arrival rate. If too many records arrive to be buffered safely, a message is sent back to the sender's Control Interface to signal it to suspend or slow down transmission. Similarly signals can be sent to resume normal transmission. The Retransmission Buffer of the sending SP nodes will hold tuples until the consumers are ready to process them.

The tuples flow next to the Stream Engine, which executes the relational operations of the streams that are configured for that SP node. The tuples are presented to the relevant relational views and output tuples result. The Stream Engine manages a number of threads in order to take advantage of multi-processor computer systems, and will have differing implementation with differing levels of optimization and scheduling of stream operation execution. Indexing of stream definitions will be performed for cases where there are large numbers of streams present. This ensures efficient distribution of tuples to relevant stream operation executors or interpreters. The Local Optimizer allows optimization of the execution of stream definitions locally, allowing for techniques like compilation into natively executing code. The Stream Engine is effectively a virtual machine implemented in software that processes relational stream operations. The Thread Manager manages the pool of active threads and is effectively part of the Stream Engine.

The Stream Engine responds to control commands that arrive through the Control Interface, and permit external entities to start, stop and reset the engine or specific streams, and other relevant control operations related to retransmission, recovery and relocation of streams.

The stream definitions and other configuration information arrive through the Configuration Interface. The CCS can also send out specific plug-in processing execution modules to specific SP nodes to be dynamically loaded into the stream engines of those nodes. The loading and unloading of such modules is handled by the Plug-in Manager. Such plug-in modules represent executable code used to enhance the processing operations of the Stream Engine. This is to allow for additional or updated relational operations to be loaded without taking down the SP nodes concerned. It also allows for custom plug-ins to be written with an external plug-in development kit which allows system or application specific operations to be performed. For example, all physical communication with operating system files, streams, databases or applications is performed with such plug-ins, and can include data input, data output and data transformation operations. There are primitives supplied for iterating and otherwise processing tuples within the given time window specification and to similarly access and process the fields of those tuples. Plug-ins are managed through the CCS and are dynamically loaded, unloaded or replaced. A variety of programming language interfaces is supported.

As the Stream Engine generates tuples of output streams, it passes the tuples one by one to the Retransmission Buffer manager which in turn passes them on to the Output Interface. From there they are transmitted, multicast or broadcast to the consuming SP nodes according to the configuration information of the stream (as sent by the CCS).

C. Configuration and Management of Streams and Stream Processing Over a Network Using the DDSMS Configuration is performed by interacting with the central configuration store server. There are many embodiments possible (above an embodiment is described using relational databases). Streams can be defined as SQL expressions or views. Stream definitions can written in a language that is an extended subset of SQL, one which allows for the specification of time windows (see above) but which does not support the non relational SQL operations (of which there are now many in SQL including those for updating databases, imperative programming etc.).

Alternatively, some embodiments may optionally offer a GUI based configuration of a "nodes and arcs" form, where nodes correspond to relational stream operators and arcs correspond to stream flows. Such a dataflow GUI is a natural way of representing the stream definitions.

Other embodiments are also allowed to co-exist using alternative representations of streams and the stream processing operations, such as ones based on predicate calculus (where streams are defined in terms of logical predicates—Boolean expressions on records and their fields—that must hold to be true for each record that is treated as a valid record of the stream, cf. the membership predicate of a set definition). For example, the programming language Prolog can be viewed as offering one way of defining relations, and so in this context, could be readily used as the basis of streams definitions (another way of stating this is that predicate calculus's Horn clauses can be used to define streams). {For the so-called "data logic" subset of Horn clauses where there are no embedded functions inside the predicates, only atoms and variables, there is an equivalence in expressive power with relational calculus (relational expressions with projection, join etc) for defining relations. Such definitions can be readily translated from one representation to the other and hence can be executed by the same Relational Stream Engine of the SP nodes. Timestamps of output records are derived from the input records.}

Configuration of the fields is straightforward, and follows the principles adopted by many other data dictionaries or RDBMS. Field definitions can be added, deleted or updated. The actual data of the field instance flowing through actual live streams will be unaffected by such changes once such data have been created. This is intentional and reflects the fact that the fields are essentially self-describing (see comments on fields' triples elsewhere). For configuration changes to take effect, they need to be communicated to the SP nodes through a set of provided commands.

All editing of configuration data (including operating parameters, stream definitions, field definitions, plug-in executable module definitions including file name and nature of the executable such as executable format etc) is performed through a web-based user-interface, preferably with mechanisms to import and export configuration data in XML format in files in order to facilitate external management of different versions of the complete system configuration. This is useful for testing purposes and to allow reinstatement of earlier configurations following disasters. The CCS itself in some embodiments will also support versioning of configurations whereby an archive of different complete configurations is maintained.

D. Applications of DDSMS

DDSMS have many potential applications. First they can be used to process streaming records from distributed service components or elements to aggregate down, filter, and otherwise construct complete transaction records for analysis or billing. They have applications in billing for wireless and wire-line telephony, for data and other services.

Secondly, they can be used for data preprocessing and collection in order to efficiently build databases and data warehouses, providing a real-time and much more flexible technology to replace today's primarily batch oriented ETL tools (Extract Translate and Load) such as the ETL products of companies like Informatica.

Thirdly, they can be used to construct distributed peer-to-peer applications as an alternative to Message Broker technology. Message brokers allow applications to communicate through so-called "Publish and Subscribe" interfaces, passing data record by record. They have the disadvantage that they force people to program such services with what is often called inverted logic (also known as event processing logic) where the receiver program has to be written with programming logic that has to allow for the program to receive records of potentially any type and at any time. This is in order to allow for the occurrence of any type of event that might transpire at any time. State machines have to be written to keep track of where the program is in the overall lifecycle of processing data. DDSMS offer a number of advantages over Message Brokers. They allow multiple, differing views of data streams to be defined (much more flexible and powerful than just the "publish and subscribe" facility of Message Brokers, which itself is similar to sharing streams of a given name). The stream is, by nature, a sequence of records, and thereby allows for conventional non-inverted logic, where applications are written as structured loops processing the records as they arrive. There is no need to create a separate state machine, and structured programming techniques readily apply. Such programs are not normally interrupted by the arrival of the next record before the current record has been processed (unless the logic explicitly requires parallel execution using so-called unblocked I/O and multiple threads). DDSMS allow for powerful operations to define these views, with power and usefulness similar to RDBMS views. They allow for non-inverted sequential processing logic to process streams record-by-record. They allow for the benefits of efficiency and scalability that arise from designing a system around large volumes of streaming records. They allow the reliable transmission and retransmission of data, with a technology designed for coping with bursts in data arrival rates. Message Brokers typically have problems scaling beyond a few thousands of records per second. DDSMS should be able to scale to hundreds of thousands of records per second. Message Brokers typically drop records if they arrive in bursts. For example, at the time of writing, the RendezVous message broker of Tibco, according the FAQ on their current website (at the time of writing) will drop records after 5000 have been queued up in the input buffer of a RendezVous server. This is not uncommon. Recursive Recovery described above offers an effective solution to this data loss problem when coupled with the Control Interfaces of SP nodes.

DDSMS have strong applicability for processing input data from sensors such as location based devices, environment sensors, machinery status sensors, plant equipment sensors, and those of engines, vehicles, and instruments. Such sources generate large volumes of data that need to be preprocessed into more manageable streams for consumption in many hack-end applications such as monitoring, alarming, billing and analysis for real-time decision making. It is a suitable basis for building SCADA and other industrial automation applications.

Other applications exist for network monitoring for all kinds of networks: electronic data, mobile, wireless, electricity, water, other utilities, highways, airways, railways and waterways—to be name but a few. The source of the data might be from SNMP MIBs (networking equipment standard) of instruments or devices, from other similar standardized protocols (e.g. CMIP), or held in proprietary structures or delivered by proprietary management protocols. Preprocessed data can be used for a wide range of applications including fraud detection, surveillance, service usage billing (both pre and post paid) and analysis applications.

E. Alternative Embodiments

There are many other potential embodiments of DDSMS, and several variations are described above.

F. Conclusion

The foregoing description of various embodiments of the invention has been presented for purposes of illustration and description. It is not intended to limit the invention to the precise forms disclosed. Many modifications and equivalent arrangements will be apparent.

What I claim is:

1. A method of managing and processing streams of data records over a data communication network linking a plurality of data processors comprising:
    (a) providing a plurality of stream processing nodes for consuming and generating streams of data records executing on said data processors;
    (b) providing a central configuration storage for holding current management and configuration data describing the names, relational stream processing operations and definition data of said streams, and for holding configuration and status data of said stream processing nodes, said central configuration storage executing on at least one of said data processors;
    (c) configuring said stream processing nodes using a user-interface to browse, create and edit configuration information in said central configuration storage, which in turn communicates over said data communication network with said stream processing nodes to effect configuration changes therein required to maintain consistency of configuration data of said stream processing nodes with the configuration data held in said central configuration storage;
    (d) generating with a translator said relational stream processing operations from relational stream processing source definitions input through said user-interface and then storing said relational stream processing operations in said central configuration storage, which in turn communicates with said stream processing nodes to effect configuration changes therein;
    (e) communicating with an external data generator to create input streams for processing by said stream processing nodes;
    (f) communicating with an external data processor to consume output streams of said stream processing nodes;

(g) transmitting data records in the form of streams comprising sequences of data records each of which comprises a set of named data fields with each field having a defined data type and holding a data value, said transmitting being from some of said stream processing nodes to others of said stream processing nodes, in order to be further processed according to the definitions of the configuration data held in said central configuration storage;

(h) processing streams transmitted to the input of each of said stream processing nodes and creating output streams from said stream processing nodes, said processing being performed within each of said stream processing nodes according to a set of relational stream processing operations by a relational stream engine of each of said stream processing nodes, respectively, and where said relational stream engine has a plug-in management feature to allow dynamic modification and extension of said processing through dynamic loading and unloading executable modules thereto or therefrom;

(i) controlling each of said stream processing nodes through a control interface, thereby remotely controlling execution of each of said stream processing nodes;

(j) configuring said stream processing nodes through a configuration interface whereby current operating parameters, current relational stream processing operations and currently loaded executable plug-in modules of each of said stream processing nodes can be dynamically modified; and (k) allowing each of said stream processing nodes to interoperate with one another dynamically through said control interface and through said configuration interface in order to control and configure processing of records by each of said stream processing node according to said configuration data stored in said central configuration storage, whereby streams can be retransmitted and redirected from any of said stream processing nodes to any other of said stream processing nodes in order to perform correct processing of records with respect to said configuration data;

whereby information processing systems can be constructed by using said stream processing nodes interfacing with said external data generator and interfacing with said external data processor so as to input external streams of records, process said external streams of records using said stream processing nodes according to the relational stream processing operations stored in the central configuration storage, and output resultant record streams.

2. The method of claim 1 wherein said relational stream processing source definitions are written in a textual language that is a subset of the sql language extended with time window constraints.

3. The method of claim 1 further comprising performing global optimization according to a set of optimization criteria stored in said central configuration storage, said global optimization comprising analyzing the configuration data of said central configuration storage and generating and storing new configuration data in said central configuration storage, and changing the configuration of said stream processing nodes such that the data sent to said external data processor and the data consumed from said external data generator are unaffected but that resources consumed by said stream processing nodes are reduced whereby overall processing performance of said stream processing nodes when operating as a complete system is optimized.

4. The method of claim 1 further comprising performing local optimization within each of said stream processing nodes to improve performance of each of said stream processing nodes.

5. The method of claim 1, further comprising providing recovery processing where said stream processing nodes communicate over the data communication network to other relevant ones of said stream processing nodes to request retransmission of data records in order to recover from detected failures.

6. The method of claim 1 wherein all of said stream processing nodes execute on a single data processing computer.

7. The method of claim 1 wherein said stream processing nodes store streams in a recovery buffer for possible retransmission.

8. The method of claim 7 wherein said recovery buffers are stored in persistent storage.

9. The method of claim 1 wherein the relational stream processing of records is performed in real-time according to timing constraints stored in said central configuration storage.

10. The method of claim 1 wherein said communicating with an external data generator results in generating streams of records each of which are automatically augmented with a timestamp field indicating their time of creation.

11. The method of claim 10 wherein the processing of records is performed in real-time, the timing of said processing being governed by timing constraints stored in said central configuration storage.

12. The method of claim 1 wherein said external data generator generates records in a format produced by external software application components and said external data processor consumes records output by said stream processing nodes, where said application components execute on at least one computer, and wherein said method thereby translates records from said format to required input formats of other of said application components, thereby providing improved translation throughput and system manageability, and real-time matching of records having the same field and values, and clearly separating the data streams and their management from the application components and their management, insulating said application components from change to one another.

13. The method of claim 1 wherein said external data generator generates records representing messages in a format produced by external software application components and said external data processor consumes said records representing messages, wherein said application components execute on at least one computer, and wherein said method thereby brokers messages between said application components, thereby providing improved flexibility, message throughput, system manageability and real-time matching of messages having the same fields and values.

14. The method of claim 1 wherein said external data generator generates records representing streaming market data, and said external data processor passes said records to a plurality of consumers and wherein said method thereby distributes said records as streaming preprocessed market data records to said plurality of consumers, thereby providing improved preprocessing flexibility, system throughput, system manageability and real-time matching of records with common market instrument identity fields.

15. The method of claim 1 wherein said external data generator generates records representing streaming sensor data and said external data processor passes the records to a plurality of consumers, and wherein said method thereby distributes said records as streaming preprocessed sensor data to said plurality of consumers, thereby providing improved preprocessing flexibility, throughput, system manageability and real-time matching of records with common sensor identity fields within a specified time window.

16. The method of claim 1 wherein said external data generator generates records representing streaming location data records for mobile devices and said external data processor passes the records to a plurality of consumers, and wherein said method thereby distributes said records as streaming preprocessed location based data records to said plurality of consumers, thereby providing improved preprocessing flexibility, throughput, system manageability and real-time matching of records with the same location fields within a specified time window.

17. The method of claim 1 wherein said external data generator generates records representing streaming incomplete service detail records and said external data processors passes the records to a plurality of consumers, and wherein said method thereby distributes said records as streaming preprocessed service detail records to said plurality of consumers, thereby providing improved benefits are afforded of superior preprocessing flexibility, throughput and system manageability.

18. The method of claim 1 wherein said external data generator generates records representing streaming incomplete data records and said external data processor passes the records to a plurality of consumers of streaming preprocessed service detail records, and wherein said method thereby merges, aggregates, and otherwise completes said streaming incomplete data records to said plurality of consumers including data warehouse and database systems executing on computers, thereby providing improved preprocessing flexibility, throughput and system manageability.

* * * * *